US008741383B2

(12) United States Patent
Kobayashi et al.

(10) Patent No.: US 8,741,383 B2
(45) Date of Patent: Jun. 3, 2014

(54) METHOD OF PRODUCING OPTICAL FILM AND COATING LIQUID FOR PRODUCTION OF OPTICAL FILM

(75) Inventors: Motokazu Kobayashi, Yokohama (JP); Hiroyuki Tanaka, Kawasaki (JP); Teigo Sakakibara, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 768 days.

(21) Appl. No.: 12/751,523

(22) Filed: Mar. 31, 2010

(65) Prior Publication Data
US 2010/0255189 A1  Oct. 7, 2010

(30) Foreign Application Priority Data

Apr. 6, 2009 (JP) ................................. 2009-092421

(51) Int. Cl.
*B05D 5/06* (2006.01)
(52) U.S. Cl.
USPC .......................................................... 427/162
(58) Field of Classification Search
USPC .......................................................... 427/162
See application file for complete search history.

(56) References Cited

U.S. PATENT DOCUMENTS 5,278,106 A * 1/1994 Nakashima et al. ............ 501/12
2008/0002259 A1 * 1/2008 Ishizawa et al. ............. 359/581

FOREIGN PATENT DOCUMENTS

WO          02/18982 A      3/2002
WO      WO 2007/148938     * 12/2007

* cited by examiner

Primary Examiner — Elizabeth Burkhart
(74) Attorney, Agent, or Firm — Canon U.S.A., Inc., IP Division

(57) ABSTRACT

Provided is a method of producing an optical film which has an excellent strength and a low refractive index, and can be used for an optical antireflective film. The production method includes preparing a coating liquid including a capsule having a shell of a halogenated compound of an element of Group 2 by forming an emulsion of one of an aqueous solution including a compound containing an element of Group 2 and an aqueous solution including a compound containing a halogen, and an organic solvent, applying the coating liquid on a substrate, and heating the coating liquid, thereby forming an optical film containing a hollow particle having the shell of a halogenated compound of an element of Group 2.

6 Claims, 1 Drawing Sheet

METHOD OF PRODUCING OPTICAL FILM AND COATING LIQUID FOR PRODUCTION OF OPTICAL FILM

BACKGROUND OF THE INVENTION

1. Field of the Invention

The present invention relates to a method of producing an optical film used for an optical antireflective film and using a capsule having a hollow structure and a coating liquid for a production of an optical film, in particular, an optical film having a particularly excellent strength and a low refractive index.

2. Description of the Related Art

Antireflection methods with an antireflective film include a method involving forming a thin film having a thickness close to a light wavelength to reduce a reflectance by an interference effect of light, and a treatment method involving forming fine irregularities using fine particles and scattering a reflective image by light scattering to make an outline vague.

The method of reducing a reflectance by an interference effect of light includes a method involving forming a transparent material having a low refractive index, such as magnesium fluoride, calcium fluoride, or silica, into a film with a thickness of several tens of nanometers to several hundred nanometers on a substrate. Meanwhile, halogenated compounds of elements of Group 2 are known to have a low refractive index.

For example, the halogenated compounds of elements of Group 2 include magnesium fluoride, which has a refractive index of 1.38. However, by forming magnesium fluoride into a thin film with a thickness of around a hundred nanometers on a surface of a lens having a refractive index of about 1.50, the reflectance of the lens can be reduced to 2% or less in a visible region of from 400 to 700 nanometers.

In order to make a reflectance of the lens lower, a refractive index must be made lower. For accomplishing the purpose, a refractive index can be lowered by forming voids in a film of the above-mentioned magnesium fluoride, calcium fluoride, or silica, because the refractive index of air is 1.0. For example, when a thin film of magnesium fluoride having a refractive index of 1.38 includes voids at 30% (volume), the refractive index of the film can be lowered to 1.27. Further, in general, as a refractive index becomes lower, a reflectance can be reduced more.

As a method of incorporating voids efficiently, there is a report that fine particles of magnesium fluoride are produced, the fine particles with a binder are formed into a film, and voids are formed in gaps between the particles, thereby being capable of reducing a refractive index (see International Publication No. 02/018982).

However, in International Publication No. 02/018982, in order to increase the voids for lowering the refractive index, the diameter of the fine particles of magnesium fluoride must be made larger, and an amount of the binder must be made smaller. As a result, reduction in the amount of the binder contributes to weaker binding forces between particles, between a particle and a substrate, and between a particle and its lower film, resulting in detachment of a particle from a substrate.

SUMMARY OF THE INVENTION

The present invention has been made in view of the above-mentioned background art. The present invention provides a method of producing an optical film that has an excellent strength and a low refractive index and can be used for an optical antireflective film, and a coating liquid for a production of an optical film.

A method of producing an optical film for solving the above-mentioned problems includes: preparing a first solution by mixing one of an aqueous solution including a compound containing an element of Group 2 and an aqueous solution including a compound containing a halogen, and a first oily organic solvent, thereby forming an emulsion; preparing a second solution by adding a second oily organic solvent to the first solution, thereby forming an emulsion; preparing a third solution by adding to the second solution a solution other than the solution used in preparing the first solution, out of the aqueous solution including a compound containing an element of Group 2 and the aqueous solution including a compound containing a halogen, thereby forming a shell of a halogenated compound of an element of Group 2; preparing a fourth solution by adding a solution containing a component serving as a binder to the third solution; applying the fourth solution on a substrate; and heating the fourth solution applied on the substrate, thereby forming an optical film containing a hollow particle having the shell of a halogenated compound of an element of Group 2.

A coating liquid for a production of an optical film for solving the above-mentioned problems includes a capsule having a shell of a halogenated compound of an element of Group 2 and a core containing a compound having a boiling point of 300° C. or less, the capsule being dispersed in a solvent in which at least silazane is dissolved.

The present invention can provide an optical film which has an excellent strength and a low refractive index and can be used for an optical antireflective film, a coating liquid for a production of an optical film, and a method of producing an optical film.

In addition, the present invention can be used for both a method of reducing a reflectance by an interference effect of light by controlling the diameter of a capsule particle and a treatment method involving forming fine irregularities and scattering a reflective image by light scattering to make an outline vague.

Further features of the present invention will become apparent from the following description of exemplary embodiments with reference to the attached drawings.

DESCRIPTION OF THE EMBODIMENT

Hereinafter, an embodiment of the present invention is described in detail.

In the method of producing an optical film according to the present invention, an optical film can be produced by using the following coating liquid for the production of an optical film.

The coating liquid for the production of an optical film according to the present invention includes a capsule having a shell of a halogenated compound of an element of Group 2 and a core containing a compound having a boiling point of 300° C. or less, the capsule being dispersed in a solvent in which at least silazane is dissolved.

Hereinafter, a method of preparing the coating liquid for the production of an optical film of the present invention is first described.

Figure 1A:
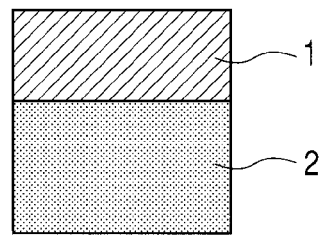
FIGS. 1A, 1B, 1C and 1D are schematic views illustrating an embodiment of a method of producing the coating liquid for the production of an optical film according to the present invention.
Figure 1B:
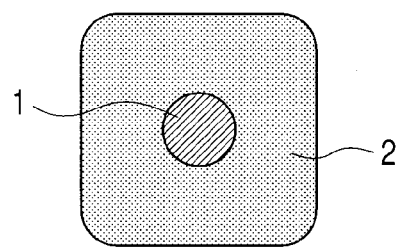
Figure 1C:
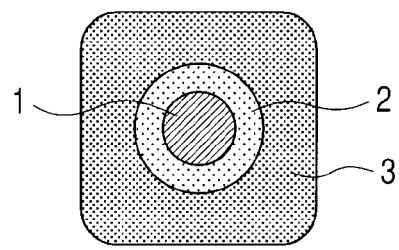
Figure 1D:
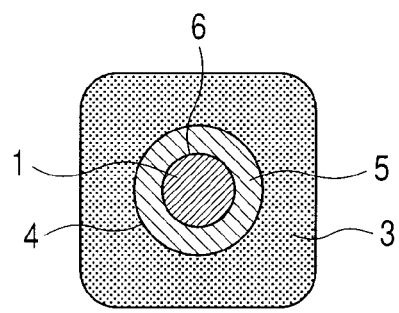

FIGS. 1A to 1D are schematic views illustrating an embodiment of a method of producing the coating liquid for the production of an optical film according to the present invention. FIG. 1A is a schematic view illustrating the case where one of an aqueous solution including a compound containing an element of Group 2 and an aqueous solution including a compound containing an element of Group 17 (halogen) is produced, and the resultant is mixed with an organic solvent. In FIG. 1A, a symbol 1 represents an organic solvent phase, and a symbol represents an aqueous solution phase. FIG. 1B is a schematic view illustrating the case where the mixture is further formed into an O/W type emulsion. FIG. 1C is a schematic view illustrating the case where an O/W/O type emulsion is formed by further using an organic solvent. A symbol 3 represents an organic solvent phase. FIG. 1D is a schematic view illustrating the case where the O/W/O type emulsion is further subjected to a reaction to form a capsule. Symbols 4, 5, and 6 represent a capsule, a shell, and a core, respectively.

A hollow particle of the present invention is a capsule having a shell of a halogenated compound of an element of Group 2 and a hollow core. The capsule can be produced by causing a compound containing an element of Group 2 and a compound containing an element of Group 17 (halogen) to react.

A method of producing the hollow particle of the present invention includes the following four steps.

(1) one of an aqueous solution including a compound containing an element of Group 2 and an aqueous solution including a compound containing an element of Group 17 (halogen), and a first oily organic solvent are mixed (see FIG. 1A).

(2) a first solution is prepared by forming an O/W type emulsion from the solution obtained in the above-mentioned item (1) (see FIG. 1B).

(3) a second solution is further prepared by forming an O/W/O type emulsion with the addition of a second oily organic solvent to the first solution (see FIG. 1C).

(4) a third solution is prepared by causing the aqueous solution containing a compound which was not used in the above-mentioned item (1) is added to the above second solution to cause a reaction and forming a capsule having a shell of a halogenated compound of an element of Group 2 (see FIG. 1D).

Examples of compounds including elements of Group which may be used include silicates, carbonates, phosphates, nitrates, and halogen compounds of elements of Group 2. Examples of silicates of elements of Group 2 include magnesium silicate, calcium silicate, and barium silicate; examples of carbonates of elements of Group 2 include magnesium carbonate, calcium carbonate, barium carbonate, and strontium carbonate; examples of phosphates of elements of Group 2 include magnesium phosphate, and calcium hydrogen phosphate; examples of nitrates of elements of Group 2 include magnesium nitrate, calcium nitrate, strontium nitrate, and barium nitrate; and examples of halogen compounds of elements of Group 2 include magnesium chloride, magnesium bromide, calcium chloride, calcium bromide, and barium bromide.

Examples of compounds including elements of Group (halogen) include lithium fluoride, sodium fluoride, potassium fluoride, cesium fluoride, hydrofluoric acid, ammonium fluoride, trifluoroacetate, hexafluoroacetate, lithium chloride, sodium chloride, potassium chloride, cesium chloride, lithium bromide, sodium bromide, and potassium bromide.

Any of the above-mentioned compounds is used for a reaction as an aqueous solution. In the case where the compounds are poorly dissolved in water, an acid, an alkali, an organic solvent, or the like may be added in small amount.

Next, the solution is mixed with the first oily organic solvent (FIG. 1A), resulting in separated phases of an organic solvent phase 1 and an aqueous solution phase 2.

Examples of the first oily organic solvent to be used in the present invention are preferably those which are hard to mix with water. Specific examples thereof include benzene, xylene, toluene, cumene, styrene, diethylether, dibutylether, propylether, n-hexane, cyclohexane, isohexane, n-heptane, isoheptane, n-octane, isooctane, methylene chloride, chloroform, ethylene chloride, trichloroethane, trichloroethylene, butyl acetate, isobutyl acetate, sec-butyl acetate, tert-butyl acetate, mineral spirit, and paraffin-based solvents. Solvents other than those may be used or two or more thereof may be used in combination.

The first oily organic solvent to be used in the present invention is preferably a catalyst having a boiling point of 300° C. or less. Use of a catalyst having a boiling point of more than 300° C. is not preferred, because the use of the catalyst may cause deterioration of a substrate owing to heat. It should be noted that the catalyst having a boiling point of more than 300° C. may be used if the heat-resistant temperature of a substrate is 300° C. or more.

Next, a first solution is prepared by forming an O/W type emulsion from the mixture obtained by mixing one of the aqueous solution including a compound containing an element of Group 2 and the aqueous solution including a compound containing an element of Group 17 (halogen), and a first oily organic solvent (FIG. 1B). The words "O/W type emulsion" refer to an emulsion in which an oil droplet (organic solvent phase) is present in an aqueous phase. As illustrated in FIG. 1B, oil droplets of the organic solvent phase 1 are dispersed in the aqueous solution phase 2.

For forming an emulsion, there can be used a stirrer, an ultrasonic disperser, a high-speed stirring homogenizer, a homogenizer for hitting solutions with each other under high pressure, or the like.

For forming an O/W type emulsion, surfactants may be used. Preferred surfactants include nonionic surfactants having an HLB value (value showing an affinity of a surfactant to water or oil) of about 8 to 16.

Specific examples of the surfactants include polyoxyethylene laurylether, polyoxyethylene cetylether, polyoxyethylene stearylether, polyoxyethylene oleylether, polyoxyethylene alkylether, polyoxyethylene myristylether, polyoxyethylene octyldodecylether, polyoxyethylene alkylenealkylether, polyoxyethylene polyoxypropylene glycol, polyoxyethylene tribenzyl phenylether, polyoxyalkylene alkenylether, sorbitan monolaurate, sorbitan monopalmitate, sorbitan monostearate, sorbitan distearate, sorbitan tristearate, sorbitan monooleate, sorbitan triolate, polyoxyethylene sorbitan monolaurate, polyoxyethylene sorbitan tristearate, polyoxyethylenesorbitan triisostearate, tetra oleic acid polyoxyethylene solbit, glycerol monostearate, glycerol monooleate, polyethylene glycol monolaurate, polyethylene glycol monostearate, polyethylene glycol distearate, polyoxyethylene hardened castor oil, polyoxyethylene alkylamine, and alkylalcanolamide.

Of the compounds, those having an HLB value of about 8 to 16 are selected, and then one of them may be used alone or a plurality of kinds of them may be used.

The particle diameter of a capsule can be controlled depending on equipment, reaction conditions, and the kind of surfactants at the time of preparing an emulsion.

When a capsule is used in a method of reducing a reflectance by an interference effect of light, the average particle diameter of the capsule (D50) is preferably about 10 nm to 100 nm. Meanwhile, when a capsule is used in a treatment method involving forming fine irregularities and scattering a reflective image by light scattering to make an outline vague, the average particle diameter of the capsule (D50) is preferably about 100 nm to several micrometers.

Next, a second solution is prepared by forming an O/W/O type emulsion with the addition of a second oily organic solvent to the first solution, which is an O/W type emulsion (FIG. 1C). The words "O/W/O type emulsion" refer to an emulsion in which an aqueous phase covers around oil droplets and an organic solvent phase is present outside the aqueous phase. As illustrated in FIG. 1C, an aqueous solution phase 2 covers around the oil droplets of an organic solvent phase 1 and an organic solvent phase 3 is present outside the aqueous solution phase 2.

As the second oily organic solvent to be used, any of solvents that are poorly mixed with water is preferred. Specifically, there can be used any of organic solvents similar to the first oily organic solvent which is used at the time of preparing the above-mentioned O/W emulsion (first solution). It should be noted that the same solvent as the first oily organic solvent may be used, or a different solvent from the first oily organic solvent may be used.

Meanwhile, for emulsification, there can be used a stirrer, an ultrasonic disperser, a high-speed stirring homogenizer, a homogenizer for hitting solutions with each other under high pressure, or the like.

A surfactant may be used as the case where the first solution was used.

Preferred surfactants include nonionic surfactants having an HLB value (value showing an affinity of a surfactant to water or oil) of about 3 to 8, the nonionic surfactants being selected from those used at the time of preparing the first solution.

After the O/W/O type emulsion (second solution) is prepared, if the solution used in the aqueous solution phase 2 at the time of preparing the first solution is a solution including a compound containing an element of Group 2, an aqueous solution including a compound containing an element of Group 17 (halogen) is added to cause a reaction. If the solution used in the aqueous solution phase 2 at the time of preparing the first solution is a solution including a compound containing an element of Group 17 (halogen), an aqueous solution including a compound containing an element of Group 2 is added to cause a reaction.

The above reaction forms a capsule 4 in which a shell 5 is a halogen compound of an element of Group 2, and a core 6 is an organic solvent phase (FIG. 1D).

The volume ratio of the capsule to the core may be altered depending on reaction conditions. The volume of the core accounting for that of the capsule is 20% or more to 85% or less, or preferably 30% or more to 85% or less. The case where the volume of the core accounting for that of the capsule is less than 20% is not preferred, because the effect of hollowness is not significantly exhibited in the refractive index. Meanwhile, the case where the volume of the core accounting for that of the capsule is more than 85% is not preferred, because the strength of an optical film is not enough.

Meanwhile, for the core shape, a core is not necessary to be formed of one sphere, and for example, a plurality of spheres may aggregate to form a core, or a core may have a shape other than a sphere.

After the reaction, water, an organic solvent, or the like is added to perform decantation. As a result, unwanted substances such as salts which are by-products and a surfactant are removed. After removal of the unwanted substances, a solution in which capsules are dispersed is taken out and used for preparing a coating liquid.

The coating liquid is prepared by adding, to the solution in which capsules are dispersed, a solution containing a component serving as a binder, for example, an organic polymer containing alkoxysilanes such as tetraethoxysilane, silazanes, or fluorine, a catalyst, an organic solvent, and the like, followed by their mixture.

When silazane is used as a binder, there can also be prepared a capsule including, in its core, any of the following catalysts capable of causing silazane to cure and a coating liquid including the capsule.

One of an aqueous solution including a compound containing an element of Group 2 and an aqueous solution including a compound containing an element of Group 17 (halogen), and a first oily organic solvent are mixed (see FIG. 1A). In this case, a catalyst capable of causing silazane to cure may be used instead of the first oily organic solvent, or a catalyst capable of causing silazane to cure may be dissolved in the first oily organic solvent, thereby yielding an O/W type emulsion (first solution).

Specific examples of the catalyst which can cause silazane to cure include N-heterocyclic compounds such as 1-methylpiperadine, 1-methylpiperidine, 4,4'-trimethylene dipiperidine, 4,4'-trimethylenebis(1-methylpiperidine), diazabicyclo-[2,2,2]octane, cis-2,6-dimethylpiperadine, 4-(4-methylpiperidine)pyridine, pyridine, dipyridine, α-picoline, β-picoline, γ-picoline, piperidine, lutidine, pyrimidine, pyridazine, 4,4'-trimethylene dipyridine, 2-(methylamino)pyridine, pyradine, quinoline, quinoxaline, triazine, pyrrole, 3-pyrroline, imidazole, triazole, tetrazole, and 1-methylpyrrolidine; amines such as methylamine, dimethylamine, trimethylamine, ethylamine, diethylamine, triethylamine, propylamine, dipropylamine, tripropylamine, butylamine, dibutylamine, tributylamine, pentylamine, dipentylamine, tripentylamine, hexylamine, dihexylamine, trihexylamine, heptylamine, diheptylamine, octylamine, dioctylamine, trioctylamine, phenylamine, diphenylamine, triphenylamine; and further, DBU (1,8-diazabicyclo[5,4,0]-7-undecene), DBN (1,5-diazabicyclo[4,3,0]non-5-ene), 1,5,9-triazacyclododecane, and 1,4,7-triazacyclononane.

Further examples such as organic acid, inorganic acid, metallic carboxylate, acetylacetona complex, metallic fine particles can be given as preferable catalysts. Examples of the organic acid include acetic acid, propionate, butyric acid, valerate, maleic acid, and stearic acid and examples of the inorganic acid include hydrochloric acid, nitric acid, sulfuric acid, phosphoric acid, hydrogen peroxide, chloric acid, and hydrochlorous acid.

Of those catalysts, it is preferred to use a catalyst having a boiling point of 300° C. or less. Use of a catalyst having a boiling point of more than 300° C. is not preferred, because the use of the catalyst may cause deterioration of a substrate owing to heat. It should be noted that the catalyst having a boiling point of more than 300° C. may be used if the heat-resistant temperature of a substrate is 300° C. or more.

In addition, one of those catalysts may be used alone or may be used after being dissolved in the first oily organic solvent at the time of preparing the first solution.

The preparation of the second solution, the preparation of the third solution, and the preparation of the coating liquid, which follow, can be carried out in the same manners as those described above.

The ratio of the binder (solid content) contained in the coating liquid to the capsule cannot be uniquely determined, because the ratio varies depending on the particle diameter of the capsule, the desired strength, the desired refractive index, and the kind of a substrate. When the capsules are arranged with no gaps, however, preferred are minimum quantities of capsules that are necessary for binding the capsules with each other and binding the capsule with the substrate. The approximate volume ratio of the binder (solid content) to the capsule is desirably binder:capsule=1:2.8 to 1:10. When the ratio of the capsule is more than 10, one of the binding forces between the capsule and the substrate and the binding forces of the capsules with each other declines, resulting in detachment of a film in some cases. Meanwhile, when the ratio of the capsule is less than 2.8, the ratio of a binder component such as silica increases, resulting in a rise in the refractive index.

Next, a method of producing the optical film according to the present invention by using the above-mentioned coating liquid is described. The method of producing the optical film according to the present invention is carried out by the following method.

(1) a first solution is prepared by mixing one of an aqueous solution including a compound containing an element of Group 2 and an aqueous solution including a compound containing a halogen, and a first oily organic solvent, thereby forming an emulsion.

(2) a second solution is prepared by adding a second oily organic solvent to the first solution, thereby forming an emulsion.

(3) a third solution is prepared by adding a solution other than the solution used in preparing the first solution, out of the aqueous solution including a compound containing an element of Group 2 and the aqueous solution including a compound containing a halogen, thereby forming a shell of a halogenated compound of an element of Group 2.

(4) a fourth solution is prepared by adding a solution containing a component serving as a binder to the third solution, and the fourth solution is applied on a substrate.

(5) the fourth solution applied on the substrate is heated, whereby an antireflective film containing a hollow particle having the shell of a halogenated compound of an element of Group 2 is formed.

The first oily organic solvent preferably contains a compound having a boiling point of 300° C. or less. In addition, the first oily organic solvent preferably contains a component that causes a component serving as a binder to cure. For example, when a solution containing a binder is silazane, the first oily organic solvent preferably contains a component that causes silazane to cure. As described above, when a core includes a component that causes the component serving as a binder to cure, a component undergoing curing and the binder are not brought into contact with each other at the time of the application of the coating liquid, and hence, the coating liquid is easily applied. As a result, the coating liquid can be uniformly formed into a film. Further, the component undergoing curing and a binder component are brought into contact with each other during heating, and as a result, the binder component can undergo stronger curing in addition to binding forces given by the heating. Consequently, the strength of the optical film can be enhanced.

According to the above-mentioned production method, the fourth solution is coated to the substrate followed by heating, thereby evaporating one of an organic solvent and a catalyst which are contained in the core. As a result, a capsule having a hollow core can be obtained.

Examples of the substrate which may be used in coating include glass, resin, and the like. Examples of glass include FC5, FCD1, FCD10, and LAC7 (all of which are manufactured by HOYA Corporation), N-SK4, N-SK5, N-SK10, and N-LAK10 (all of which are manufactured by Schott AG). Examples of the resin include those derived from plastic such as urethane acrylate, methacrylate, polyethylene terephthalate, and cellulose having a refractive index of 1.5 or more.

The shape of the substrate is not limited, and any of a flat shape, a curved shape, a concave shape, a convex shape, a lump shape, and a film shape is acceptable.

The method of coating is not particularly limited, either, and there can be used a usual coating method for a coating liquid in a liquid state, such as a dip coat method, a spin coat method, a spray roll method, and a roll coat method. The number of coating is preferably once usually, whereas a plurality of times of drying and coating may be repeated.

Drying follows the coating. The drying can be performed by using a drying machine, a hot plate, an electric furnace, or the like. The drying is performed at such a temperature and in such a period of time that the drying evaporates one of the organic solvent and the catalyst in the capsule without affecting a bad influence on the substrate. The temperature of 300° C. or less is typically preferred.

The optical film thus obtained preferably has a thickness of about 50 nm to 200 nm when the optical film is used in the method of reducing a reflectance by an interference effect of light. When the optical film is used in the treatment method involving forming fine irregularities and scattering a reflective image by light scattering to make an outline vague, the optical film preferably has a thickness ranging from 100 nm to 10 μm.

The optical film of the present invention is preferably an optical thin film, or preferably an optical film having a low reflectance.

Meanwhile, between the substrate and a coating surface, a single film formed of one of a film having a high refractive index and a film having a medium refractive index or a plurality of those films may be present.

The film having a high refractive index and the film having a medium refractive index specifically include a zirconium oxide, a titanium oxide, a tantalum oxide, a lanthanum oxide, a hafnium oxide, and silica.

The film having a high refractive index and the film having a medium refractive index can be formed by using, for example, a vapor deposition method, a sputtering method, a CVD method, a dip coat method, a spin coat method, a spray coat method, or a roll coat method.

The optical film of the present invention has a low refractive index, and specifically has a refractive index of 1.30 or less, or preferably 1.10 or more to 1.28 or less.

The present invention is hereinafter described more specifically by way of examples. The present invention is not limited to the following examples.

Example 1

Preparation of Coating Liquid 1

0.12 mole of potassium fluoride was dissolved in 40 ml of water, and to the resultant, added were 10 ml of an n-hexane solution to which 0.16 g of EMALEX HC-30 (manufactured by NIHON EMULSION Co., Ltd. and having an HLB value of 11) was added as a surfactant. The resultant mixed solution was subjected to a treatment with an ultrasonic disperser, thereby yielding an O/W type emulsion. To the emulsion, added was a solution prepared by mixing 1.0 g of EMALEX SS-5051 (manufactured by NIHON EMULSION Co., Ltd. and having an HLB value of 6) serving as a surfactant in 40 ml of n-hexane. The resultant mixed solution was subjected to a treatment with an ultrasonic disperser, thereby preparing an O/W/O type emulsion.

0.06 mole of magnesium chloride was dissolved in ml of water, and to the resultant, an O/W/O type emulsion solution was added under stirring. After 1 hour of the stirring, 200 ml of water were added to the resultant, followed by further stirring for 30 minutes, to thereby yield separated two phases, an oily phase and an aqueous phase. In the oily phase, capsules of magnesium fluoride whose cores contain n-hexane were obtained. The capsules were measured for their particle diameters by a laser scattering method. As a result, the average particle diameter (D50) of the capsules was found to be 200 nm.

Of the two separated phases, only the oily phase, which was the upper phase, was collected. To the separated oily phase, added were 21.6 g of Aquamika NP-110 (manufactured by AZ Electronic Materials (Japan) K.K., a product containing a silazane component at 20%) as a silazane solution (binder component). The resultant solution served as Coating Liquid 1, in which the volume ratio of the binder component (solid content) to the capsule component was binder component:capsule component=1:2.8.

Example 2

Preparation of Coating Liquid 2

0.6 mole of magnesium nitrate was dissolved in 400 ml of water, and to the resultant, added were 100 ml of an n-hexane solution to which 1.6 g of EMALEX HC-30 (manufactured by NIHON EMULSION Co., Ltd. and having an HLB value of 11) was added as a surfactant. The resultant mixed solution was subjected to a treatment with a pressure type homogenizer, thereby yielding an O/W type emulsion. To the emulsion, added was a solution prepared by mixing 10.0 g of EMALEX SS-5051 (manufactured by NIHON EMULSION Co., Ltd. and having an HLB value of 6) serving as a surfactant in 400 ml of n-hexane. The resultant mixed solution was subjected to a treatment with an ultrasonic disperser, thereby preparing an O/W/O type emulsion.

48 g of a 50% hydrofluoric acid aqueous solution (containing 1.2 moles of a hydrofluoric acid component) were dissolved in 400 ml of water, and to the resultant, an O/W/O type emulsion solution was added under stirring. After 1 hour of the stirring, 2000 ml of water were added to the resultant, followed by further stirring for 30 minutes, to thereby yield separated two phases, an oily phase and an aqueous phase. In the oily phase, capsules of magnesium fluoride whose cores contain n-hexane were obtained. The capsules were measured for their particle diameters by a laser scattering method. Consequently, the average particle diameter (D50) of the capsules was found to be 40 nm. Further, part of the capsules was dried and subjected to a specific gravity measurement. As a result, the volume of the core was found to be about 73%.

Of the two separated phases, only the oily phase, which was the upper phase, was collected. To the separated oily phase, added were 216 g of Aquamika NP-110 (manufactured by AZ Electronic Materials (Japan) K.K., a product containing a silazane component at 20%) as a silazane solution (binder component). The resultant solution served as Coating Liquid 2, in which the volume ratio of the binder component to the capsule component was binder component (solid content):capsule component=1:2.8.

Example 3

Preparation of Coating Liquid 3

In Example 2, added were 61.5 g of Aquamika NP-110 (manufactured by AZ Electronic Materials (Japan) K.K., a product containing a silazane component at 20%) as a silazane solution. The resultant solution served as Coating Liquid 3, in which the volume ratio of the binder component to the capsule component was binder component (solid content):capsule component=1:10.

Example 4

Preparation of Coating Liquid 4

0.6 mole of magnesium nitrate was dissolved in 400 ml of water. To the resultant magnesium nitrate aqueous solution, added was a solution prepared by adding 1.6 g of EMALEX HC-30 (manufactured by NIHON EMULSION Co., Ltd. and having an HLB value of 11) as a surfactant and 2.0 g of n-octylamine serving as a catalyst of silazane in 100 ml of n-hexane. The resultant mixed solution was subjected to a treatment with a pressure type homogenizer, thereby yielding an O/W type emulsion. To the emulsion, added was a solution prepared by mixing 10 g of EMALEX SS-5051 (manufactured by NIHON EMULSION Co., Ltd. and having an HLB value of 6) serving as a surfactant in 400 ml of n-hexane. The resultant mixed solution was subjected to a treatment with an ultrasonic disperser, thereby preparing an O/W/0 type emulsion.

48 g of a 50% hydrofluoric acid aqueous solution (containing 1.2 moles of a hydrofluoric acid component) were dissolved in 400 ml of water, and to the resultant, an O/W/O type emulsion solution was added under stirring. After 1 hour of the stirring, 2000 ml of water were added to the resultant, followed by further stirring for 30 minutes, to thereby yield separated two phases, an oily phase and an aqueous phase. In the oily phase, capsules of magnesium fluoride whose cores contain n-hexane and n-octylamine were obtained. The capsules were measured for their particle diameters by a laser scattering method. Consequently, the average particle diameter of the capsules was found to be 40 nm. Further, part of the capsules was dried and subjected to a specific gravity measurement. As a result, the volume of the core was found to be about 55%.

Of the two separated phases, only the oily phase, which was the upper phase, was collected. To the separated oily phase, added were 61.5 g of Aquamika NN-110 (manufactured by AZ Electronic Materials (Japan) K.K., a product containing a silazane component at 20%) as a silazane solution (binder component) which contains no catalyst. The resultant solution served as Coating Liquid 4, in which the volume ratio of the binder component to the capsule component was binder component (solid content):capsule component=1:10.

Example 5

Coating Liquid 1 was coated on a triacetylcellulose film with a thickness of 100 μm, and the liquid coated was dried at 130° C. for 30 minutes. The thickness of the film produced was 8 μm.

Example 6

Method of Producing Optical Film

Coating Liquid 2 was coated using a spin coater on a silicate glass plate cleaned. In addition, the liquid coated was heated at 300° C. for 1 hour to be firmly bonded on the silicate glass plate. The thickness of the film produced was 100 nm.

Example 7

Method of Producing Optical Film

Coating Liquid 3 was coated using a spin coater on a silicate glass plate cleaned. In addition, the liquid coated was heated at 300° C. for 1 hour to be firmly bonded on the silicate glass plate. The thickness of the film produced was 100 nm.

Comparative Example 1

7.0 g of magnesium acetate tetrahydrate were dissolved in 100 g of methanol. To the resultant solution, added over 20 minutes was a solution prepared by dissolving 2.6 g of a 50% hydrofluoric acid aqueous solution (containing 0.065 mole of a hydrofluoric acid component) in 100 g of methanol, thereby yielding magnesium fluoride. Further, the resultant solution was placed in an autoclave to undergo a treatment at 180° C. for 24 hours. As a result, particles of magnesium fluoride having an average particle diameter of 30 nm were obtained. The resultant was subjected to further concentration, to thereby yield a dispersion liquid containing about 10% magnesium fluoride.

The resultant dispersion liquid was coated using a spin coater on a silicate glass plate cleaned. In addition, the liquid coated was dried at 100° C. for 1 hour. After that, there was coated a silazane solution, Aquamika NP-110 (manufactured by AZ Electronic Materials (Japan) K.K., a product containing a silazane component at 20%) as a binder so that the volume ratio of the binder component to the magnesium fluoride particle component reached binder component:magnesium fluoride particle component=1:2.8. Then, the whole was heated at 300° C. for 1 hour. As a result, the liquid coated was firmly bonded on the silicate glass plate. The thickness of the film produced was 100 nm.

Comparative Example 2

The dispersion liquid prepared in Comparative Example 1 was coated using a spin coater on a silicate glass plate cleaned. In addition, the liquid coated was heated at 100° C. for 1 hour. After that, there was coated a silazane solution, Aquamika NP-110 (manufactured by AZ Electronic Materials (Japan) K.K., a product containing a silazane component at 20%) as a binder so that the volume ratio of the binder component to the magnesium fluoride particle component reached binder component:magnesium fluoride particle component=1:10. Then, the whole was heated at 300° C. for 1 hour. As a result, the liquid coated was firmly bonded on the silicate glass plate.

Comparative Example 3

The dispersion liquid prepared in Comparative Example 1 was coated using a spin coater on a silicate glass plate cleaned. The liquid coated was heated at 100° C. for 1 hour. As a result, the liquid coated was firmly bonded on the silicate glass plate. The thickness of the film produced was 100 nm.

(Evaluation 1)

Each of the optical films produced in Example 6, Example 7, Comparative Example 1, Comparative Example 2, and Comparative Example 3 was measured for its reflectance at wavelengths from 400 nm to 700 nm by using a lens reflectance measuring instrument (USPM-RU) manufactured by OLYMPUS CORPORATION. Based on the reflectance at the wavelength of 550 nm, the refractive index of the film was determined.

(Evaluation 2)

The surface of the optical film was subjected to a test using steel wool with reciprocation of 20 times and with a load of 200 g/cm$^2$. After that, the refractive index of the film was measured in the same manner as described above.

Table 1 shows the results. Samples that showed a rise in the refractive index after the test with steel wool exhibited detachment of a capsule and flaws on their surface.

TABLE 1

|  | Refractive index (wavelength: 550 nm) | Refractive index after steel wool test (wavelength: 550 nm) |
|---|---|---|
| Example 6 | 1.20 | 1.20 |
| Example 7 | 1.13 | 1.13 |
| Comparative Example 1 | 1.40 | 1.40 |
| Comparative Example 2 | 1.33 | 1.33 |
| Comparative Example 3 | 1.22 | All the films were detached |

The table shows that Examples 6 and 7 each even have a lower refractive index than Comparative Examples 1 and 2 but have a good strength, and hence a capsule is difficult to be detached from a substrate. Further, the table shows that when the optical films produced in Examples 6 and 7 are each used as an antireflective film, a film having a lower reflectance and a good strength can be provided.

(Evaluation 3)

On both surfaces, top and bottom, of a glass plate with a thickness of 1 mm, polarizing plates having a flat and smooth surface were attached in a crossed Nichol state. To one of the surfaces of the product produced, the film produced in Example 5 was attached with its surface on which a coating liquid was not coated, to thereby produce a sample piece for measurement.

The sample piece was lit with a fluorescence lamp (8000 cd/m$^2$) from the angle of 45°, and the sample was observed from the direction of −45°. As a result, the outline of the fluorescence lamp was not substantially observed.

The optical film according to the present invention has an excellent strength and a low refractive index, and hence the optical film can be used for an optical antireflective film.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-092421, filed Apr. 6, 2009, which is hereby incorporated by reference herein in its entirety.

What is claimed is:

1. A method of producing an optical film containing hollow particles, comprising:

applying a coating liquid on a substrate, the coating liquid comprising capsules each having a shell of a halogenated compound of an element of Group 2 and a core of an oily organic solvent, the capsules being dispersed in a solvent in which at least a component serving as a binder is dissolved, the core comprising a catalyst causing the component serving as a binder to cure; and heating the capsules and the component serving as a binder on the substrate to bring the catalyst into contact with the component serving as a binder, whereby an optical film containing hollow particles having the shell of a halogenated compound of an element of Group 2 is formed, and the hollow particles are bound to each other by the cured binder.

2. The method of producing an optical film according to claim 1, wherein the halogenated compound of an element of Group 2 comprises magnesium fluoride.

3. The method of producing an optical film according to claim 1, wherein the component serving as a binder comprises silazane.

4. The method of producing an optical film according to claim 1, wherein the catalyst causing a component serving as a binder to cure contains at least one selected from the group consisting of N-heterocyclic compounds, amines, DBU (1,8-diazabicyclo[5,4,0]-7-undecene), DBN (1,5-diazabicyclo[4,3,0]non-5-ene), 1,5,9-triazacyclododecane, 1,4,7-triazacyclononane, organic acids, inorganic acids, metallic carboxylates, acetylacetona complexes, and metallic fine particles.

5. The method of producing an optical film according to claim 1, wherein the core contains a compound having a boiling point of 300° C. or less.

6. The method of producing an optical film according to claim 1, wherein the coating liquid is prepared by:
preparing a first solution by mixing one of an aqueous solution including a compound containing an element of Group 2 and an aqueous solution including a compound containing a halogen, and a first oily organic solvent, thereby forming an emulsion;
preparing a second solution by adding a second oily organic solvent to the first solution, thereby forming an emulsion;
preparing a third solution by adding to the second solution a solution other than the solution used in preparing the first solution, out of the aqueous solution including a compound containing an element of Group 2 and the aqueous solution including a compound containing a halogen, thereby forming a shell of a halogenated compound of an element of Group 2; and
preparing the coating liquid by adding a solution containing a component serving as a binder to the third solution.

* * * * *